June 7, 1960 R. O. FREDERIKSEN 2,939,424
DEMAND DELIVERY WATERING DEVICE FOR DOMESTIC HOUSE ANIMALS
Filed April 9, 1957
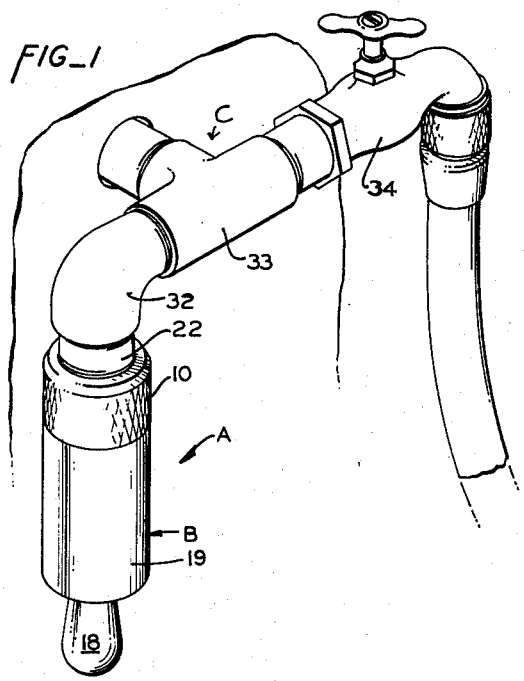
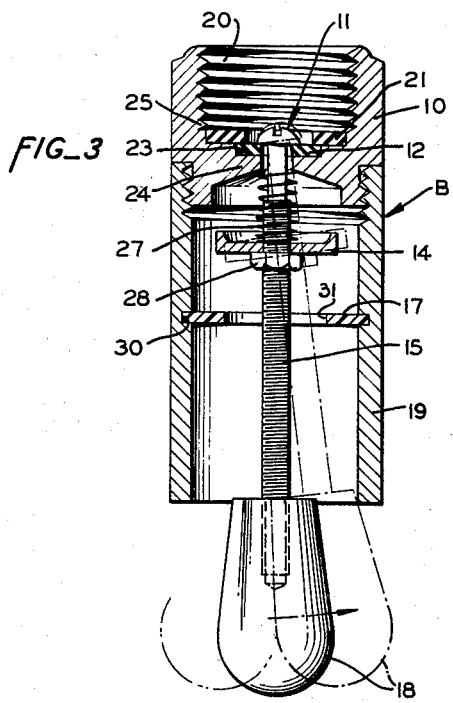
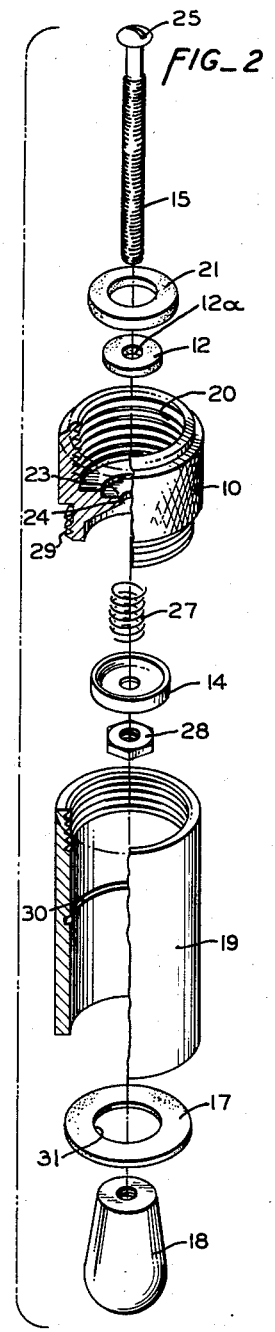
INVENTOR.
ROBERT O. FREDERIKSEN
BY
ATTORNEYS

United States Patent Office 2,939,424
Patented June 7, 1960

2,939,424

DEMAND DELIVERY WATERING DEVICE FOR DOMESTIC HOUSE ANIMALS

Robert O. Frederiksen, 859 Sierra Vista Ave., Mountain View, Calif.

Filed Apr. 9, 1957, Ser. No. 651,731

9 Claims. (Cl. 119—72.5)

The present invention relates to a demand drinking device for domestic house animals such as dogs and cats.

In my Patent No. 2,678,630 issued May 18, 1954 and Patent No. 2,726,636 issued Dec. 13, 1955 are disclosed tongue operated drinking devices of the same general character as that which comprises the subject matter of the present invention.

The present invention contemplates the provision of an improved and simplified drinking device for domestic house animals.

The invention also provides a simple and inexpensive demand drinking device which can be easily mounted on an outdoor water supply pipe to provide a constantly available supply of fresh drinking water for household pets such as dogs and cats.

The invention further provides such a drinking device having a tongue-operated wobble member which projects beyond the open end of a housing, and which, when displaced from a normal, condition co-axially of its housing, produces a gentle but adequate flow of water into the mouth of an animal displacing the pendant.

A further object of the invention is to provide a simple, quiet, drinking device for easy mounting on an outdoor water supply pipe having water under substantial pressure therein.

These, and other objects and advantages of the invention, will be apparent from the following description and the accompanying drawings, wherein Fig. 1 is a perspective view of a watering device embodying the invention as it appears when mounted on one end of a water pipe T fitting, a hose bib being mounted in the opposite end of such fitting.

Fig. 2 is an enlarged, exploded, perspective view of the component parts of the watering device shown in Fig. 1.

Fig. 3 is a further enlarged, longitudinal, medial sectional view through the device shown in Fig. 1.

Briefly, the illustrative embodiment A of the invention comprises a housing B having an upper portion 10 thereof arranged for mounting on a conventional water pipe C as shown in Fig. 1. Since the device is usually mounted in an axially upright condition and is so illustrated in the drawing, it will be described in that condition herein.

A tiltable valve 11 is seated on an annular valve seat 12 having a central valve opening 12a therein.

Tilting of the valve 11 from its normal, closed condition co-axially of the housing B as shown in solid lines in Fig. 3, to its actuated condition shown in broken lines in Fig. 3 opens the valve and allows water to flow downwardly through the housing.

A water deflecting disc 14 on the valve stem 15, and a washer-like water deflecting partition 17 in the housing slow the downward flow of water through a housing skirt portion 19.

Referring to the drawings in greater detail, in the illustrated animal watering device A the externally knurled cylindrical upper housing portion 10, having an internally threaded socket 20 therein, preferably is of a size to screw onto a conventional iron pipe thread of suitable diameter, such as for example, ½″ or ¾″.

A sealing washer 21, of rubber or other suitable material, is provided marginally within the lower end of the threaded socket 20 to seat against the end of a pipe, such as a nipple 22 (Fig. 1) screwed into the socket.

An annular recess 23, co-axial with the housing B, is provided in a transverse partition 24 in the upper housing portion 10 to receive, in fitted relation therein, the valve seat 12. The latter is of suitable material, such as a semi-hard neoprene of a type commonly employed in conventional water faucets.

The seat 12 is concentric with the central valve opening 12a, through which passes the substantially smaller diameter stem 15 of the valve 11. The valve 11 also has a head 25 of a size to overlap the valve seat 12 marginally around its central opening 12a (Fig. 2) regardless of any lateral displacement of the valve stem 15 in this opening. Therefore, when the valve stem 15 is co-axial with the housing B, the valve head 25 will seal the valve opening 12a.

A light coil spring 27 preferably is held in adjusted compression between the under side of the partition 17 and the water-deflecting disc 14, which, as illustrated, is dished on its upper side and is screwed into adjusted position on the threaded valve stem 15. A lock nut 28 holds the disc 14 in axially adjusted position on the stem.

The housing skirt portion 19 is internally threaded at its upper end and is screwed onto the reduced, externally threaded, lower end 29 of the upper housing portion 10. The annular partition 17 is mounted transversely within the skirt portion 19 below the deflector disc 14 on the valve stem. The annular partition 17 illustrated is of suitable resilient material, such as plastic or rubber, to permit it to be marginally seated in an annular groove 30 provided therefor in the skirt 19.

The central opening 31 of the annular partition 17 is of smaller diameter than the deflector disc 14, so that water ejected under line pressure from the valve opening 12a will first be slowed down and deflected laterally outwardly by the deflector disc 14, and then will encounter the annular deflector partition 17 and be further slowed down and re-deflected radially inwardly toward the center of the housing. Here the water will run out of the lower end of the housing B and thence into the mouth of an animal actuating the pendant.

The pendant 18 preferably is of smoothly polished, non-chewable material such as aluminum, and is screwed onto the lower end of the threaded valve stem 15. The pendant preferably is mounted at a height on the stem so that when it is deflected toward a side of the housing, as indicated in broken lines in Fig. 3, the pendant will engage the lower end of the skirt.

The device A can be mounted on any suitable water pipe, such as, for example, the exterior hose outlet pipe C, such as is customarily provided on houses in the United States having running water. The watering device A may be mounted as by means of a usual street L 32 and nipple 22, in one side outlet of a conventional T-fitting 33 (Fig. 1), the hose bib 34 then being screwed into the other end of the T.

Although the device A is illustrated as being mounted with the housing B in axially upright condition, this is not essential, or even important, since by adjusting the pressure on the spring 27 to hold the valve stem 15 substantially co-axially of the housing B, the valve will close effectively with usual water pressure of 25 p.s.i. or more even with the device mounted in axially horizontal condition.

After the device A has been mounted for example as shown in Fig. 1, the dog or other animal for which the device is intended may be taught to drink by bringing the animal's head close to the device and moving the pendant 18 sideways with one's finger. If the animal is thirsty, it will first lick the operator's finger, and from that point on will soon learn to operate the device itself.

After becoming familiar with the device the dog soon learns to hold the pendant to one side with his lip or cheek and to drink as the water flows out. Very small dogs, such as some of the toy breeds, and cats, find it easier to operate the device with the housing mounted axially horizontal. The thrust of the spring 21, plus the pressure of water on the valve head, and, when the device is mounted upright, the weight of the pendant 18, return the valve 11 to its seated condition upon the completion of each drinking operation.

Although the housing B is shown in two parts (Fig. 3) which is a satisfactory construction when the device is to be made of metal on conventional automatic screw machines, it will be obvious to those skilled in the art that the housing also may be made by casting it as a single unit either from metal or from a suitable plastic material. Since such changes are a matter of simple design, easily within the scope of one skilled in the art, it will be unnecessary to illustrate and described them in further detail herein.

The device comprises a simple, inexpensive and long wearing demand watering device for domestic animals and one which, once mounted, needs little or no attention.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. A demand delivery watering device comprising a tubular housing, means for connecting one end of the housing to a pipe having water under substantial pressure therein, a non-spherical, annular valve seat formed co-axially of the housing, a valve mounted co-axially of the housing and comprising a head portion adapted to seat on and close said valve seat when the valve axis is aligned with the housing, and to open when the valve axis is tilted relative to the housing, a valve stem secured coaxially to the head and extending through the valve housing oppositely from its pipe connecting means, a rounded end portion on the valve stem projecting beyond the opposite end of the housing from that having the pipe connecting means, whereby when the projecting end portion on the valve stem is deflected laterally, the valve stem is thereby tilted out of coaxial relationship with the housing, and one side of the head is tilted clear of the valve seat, thereby permitting a flow of water under pressure through the valve housing, and an annular flow deflecting partition projecting inwardly from the housing beyond the valve seat to deflect water flowing along the inside of the valve housing radially inwardly toward the valve stem, and to reduce its flow velocity.

2. An arrangement according to claim 1 wherein the valve stem is threaded and a deflector disk having a threaded hole co-axially thereof is threaded onto the valve stem, and means for locking the deflector disk in adjusted position axially of the valve stem.

3. A demand delivery watering device comprising a tubular housing, said housing comprising an upper housing portion, a non-spherical valve seat in the upper housing portion, a tubular skirt threadedly connected to the upper housing portion co-axially of the valve seat, means for connecting the upper housing portion to a pipe having water under substantial pressure therein, a valve comprising a head portion formed for seating on said valve seat when the valve is co-axial with the seat, and for opening at one side from the seat when the valve is tilted out of co-axial relation with the seat, a valve stem secured coaxially to the head and extending through the valve housing oppositely from its pipe connecting means, spring means biasing the valve to seated condition on its seat and the valve stem to a position co-axially of the skirt, and a rounded pendant end portion on the valve stem projecting beyond the opposite end of the skirt from that connected to the upper housing portion, whereby, when the valve stem is tilted out of coaxial relationship with the housing, one side of the head is tilted clear of the valve seat, thereby permitting a flow of water under pressure through the valve housing.

4. An arrangement according to claim 3 wherein an annular flow deflecting partition is mounted within the skirt to deflect radially inwardly, and to slow down, water flowing along the inside of the skirt.

5. A demand delivery watering device comprising a tubular housing having a threaded socket in its upper end of a size to screw onto a predetermined pipe having water under substantial pressure therein, an annular, non-spherical valve seat disposed transversely within the tubular housing adjacent the threaded socket, a valve mounted co-axially of the seat and comprising a head portion adapted to seat on and close said seat when the valve is coaxial with the housing, and to lift clear of the seat at one side thereof when the valve is tilted axially relative to the seat, a valve stem secured coaxially to the head and extending through the valve housing oppositely from said socket, a rounded pendant lower end portion on the valve stem extending beyond the opposite end of the housing from that having the socket therein, whereby, when the valve stem is tilted out of coaxial relationship with the housing, one side of the head is tilted clear of the valve seat, thereby permitting a flow of water under pressure from the socketed end through the valve housing, and an annular flow deflecting partition projecting inwardly from the housing and in contact therewith throughout its circumference, thereby to deflect water flowing along the inside of the valve housing radially inwardly toward the valve stem, and to reduce its flow velocity.

6. A demand delivery dog watering device comprising an elongated tubular housing, means for connecting the upper end of the housing to a downwardly extending pipe having water under substantial pressure therein, a non-spherical, annular valve seat formed co-axially of and adjacent the upper end of the housing, a valve mounted co-axially of the housing and comprising a head portion adapted to seat on and close said valve seat when the valve axis is aligned with the housing, and to open when the valve axis is tilted relative to the housing, a valve stem secured co-axially to the head and extending downwardly therefrom through and projecting below the lower end of the valve housing, an enlarged rounded end on the lower, projecting portion of the valve stem, a deflector disk of smaller diameter than the interior of the housing below the valve seat secured co-axially to the valve stem in the path of water ejected through the valve seat upon opening the valve, and an annular baffle extending radially inwardly from the valve housing below said disk, whereby, when the projecting end portion of the valve stem is deflected laterally by a dog's open mouth, the valve stem is thereby tilted out of co-axial relationship with the housing, and one side of the head is tilted clear of the valve seat, thereby permitting a flow of water under pressure through the valve seat onto said disk for deflection thereby toward the valve housing, and thence downwardly, along the inside of the valve housing for further deflection radially inwardly toward the valve stem to thereby reduce the flow velocity of such water, for gravitational flow along and off the enlarged lower end of the valve stem into the mouth of such dog.

7. A demand delivery dog watering device comprising an elongated tubular housing, means for connecting the upper end of the housing to a downwardly extending pipe having water under substantial pressure therein, a tilt operating valve in the upper end of the housing, a valve stem secured to the valve and extending downwardly therefrom through and projecting below the lower end of the valve housing, an enlarged rounded end of the lower, projecting portion of the valve stem, a deflector disk of smaller diameter than the interior of the housing below the valve seat secured co-axially to the valve stem in the path of water ejected through the valve upon opening the latter, and an annular baffle extending radially inwardly from the valve housing below said disk, whereby, when the projecting end portion of the valve stem is deflected laterally by a dog's open mouth, the valve is thereby opened to cause a flow of water under pressure through the valve onto the disk, for deflection by the latter toward the housing wall beyond disk, whence the water gravitates downwardly along the inside of the housing for further slowing of velocity and deflection radially inwardly toward the valve stem, by said annular baffle, and thence downwardly off the lower end of the enlarged lower end of the valve stem into the mouth of such dog.

8. An arrangement according to claim 2 wherein the upper side of the disk is cupped with its concave side uppermost, thereby to reverse the direction of flow of the pressurized stream of water discharged through the valve and striking said disk.

9. An arrangement according to claim 1 wherein the disk is mounted for adjustable movement lengthwise along the stem for controlling the discharge of water through the device.

References Cited in the file of this patent

UNITED STATES PATENTS

| | | |
|---|---|---|
| 1,797,963 | Neller | Mar. 24, 1931 |
| 1,916,513 | Jones | July 4, 1933 |
| 2,319,928 | Hart | May 25, 1943 |
| 2,614,531 | Futterer | Oct. 21, 1952 |
| 2,710,594 | Thompson | June 14, 1955 |